(12) United States Patent
Takata et al.

(10) Patent No.: US 12,613,061 B2
(45) Date of Patent: Apr. 28, 2026

(54) REEFER CONTAINER

(71) Applicant: MITSUBISHI HEAVY INDUSTRIES, LTD., Tokyo (JP)

(72) Inventors: Ryo Takata, Tokyo (JP); Kazuki Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 191 days.

(21) Appl. No.: 18/703,975

(22) PCT Filed: Feb. 22, 2023

(86) PCT No.: PCT/JP2023/006343
§ 371 (c)(1),
(2) Date: Apr. 23, 2024

(87) PCT Pub. No.: WO2023/203863
PCT Pub. Date: Oct. 26, 2023

(65) Prior Publication Data
US 2025/0003665 A1 Jan. 2, 2025

(30) Foreign Application Priority Data
Apr. 20, 2022 (JP) ................................. 2022-069661

(51) Int. Cl.
*F25D 17/04* (2006.01)
*B01D 53/22* (2006.01)
(Continued)

(52) U.S. Cl.
CPC ........... *F25D 17/042* (2013.01); *B01D 53/22* (2013.01); *F25B 9/004* (2013.01); *F25B 9/06* (2013.01);
(Continued)

(58) Field of Classification Search
CPC ...... F25D 11/003; F25D 17/042; F25B 9/004; F25B 43/00
See application file for complete search history.

(56) References Cited

U.S. PATENT DOCUMENTS

| | | |
|---|---|---|
| 5,457,963 A | 10/1995 | Cahill-O'Brien et al. |
| 2003/0005718 A1 | 1/2003 | Mitani et al. |

(Continued)

FOREIGN PATENT DOCUMENTS

| | | |
|---|---|---|
| JP | 2635536 B2 | 7/1997 |
| JP | 9-210534 A | 8/1997 |

(Continued)

OTHER PUBLICATIONS

International Preliminary Report on Patentability and Written Opinion of the International Searching Authority for International Application No. PCT/JP2023/006343, dated Oct. 31, 2024, with an English translation.

(Continued)

*Primary Examiner* — Christopher R Zerphey
(74) *Attorney, Agent, or Firm* — Birch, Stewart, Kolasch & Birch, LLP

(57) ABSTRACT

A reefer container configured to cool a gas inside a container body, including: the container body; a circulation line with a suction port and a blowout port each of which is disposed inside the container body; a compressor disposed in the circulation line and configured to compress the gas suctioned from inside the container body to the circulation line through the suction port; a heat exchanger disposed in the circulation line and configured to cool the gas compressed in the compressor; an expander disposed in the circulation line and configured to expand the gas cooled in the heat exchanger; and at least one separation device disposed in the (Continued)

circulation line and configured to separate some of components from the gas compressed in the compressor.

8 Claims, 10 Drawing Sheets

(51) Int. Cl.

| | |
|---|---|
| *F25B 9/00* | (2006.01) |
| *F25B 9/06* | (2006.01) |
| *F25B 43/00* | (2006.01) |
| *F25D 11/00* | (2006.01) |

(52) U.S. Cl.
CPC ............ *F25B 43/00* (2013.01); *F25D 11/003* (2013.01); *B01D 2053/224* (2013.01); *F25D 2317/041* (2013.01); *F25D 2317/06* (2013.01)

(56) References Cited

U.S. PATENT DOCUMENTS

| | | |
|---|---|---|
| 2006/0236715 A1 | 10/2006 | Nikai et al. |
| 2007/0169503 A1 | 7/2007 | Kikuchi et al. |
| 2009/0211298 A1 | 8/2009 | Saul |
| 2010/0313596 A1 | 12/2010 | Kikuchi et al. |
| 2020/0253227 A1 | 8/2020 | Kamei et al. |

FOREIGN PATENT DOCUMENTS

| | | |
|---|---|---|
| JP | 2003-81195 A | 3/2003 |
| JP | 2007-99131 A | 4/2007 |
| JP | 2010-14301 A | 1/2010 |
| JP | 2019-66169 A | 4/2019 |
| JP | 2023-94906 A | 7/2023 |
| WO | WO 2005/057087 A1 | 6/2005 |
| WO | WO 2006/011251 A1 | 2/2006 |

OTHER PUBLICATIONS

International Search Report and Written Opinion of the International Searching Authority for International Application No. PCT/JP2023/006343, dated Apr. 18, 2023.

REEFER CONTAINER

TECHNICAL FIELD

The present disclosure relates to a reefer container configured to cool a gas inside a container body.

This application claims the priority of Japanese Patent Application No. 2022-069661 filed on Apr. 20, 2022, the content of which is incorporated herein by reference.

BACKGROUND

A reefer container is a container having a refrigeration function to freeze or refrigerate goods such as cargo stored in the container.

A conventional reefer container may use a refrigerator that has a closed cycle, where a working fluid is circulated, and uses evaporation and condensation action of the working fluid circulating through the closed cycle. If the reefer container is a CA (Controlled Atmosphere) container in which the constituent concentration of air (for example, the concentration of oxygen or carbon dioxide) can be adjusted, a specialized device such as an air compressor or a flow path for taking out the air inside the container and sending the air into a membrane for separating oxygen is required in addition to the above-described refrigerator (see Patent Document 1).

CITATION LIST

Patent Literature

Patent Document 1: JP2635536B

SUMMARY

Technical Problem

In the reefer container described in Patent Document 1, a device dedicated to the CA container, a device (evaporator) configuring the refrigerator, and devices (a fan and a motor) for circulating air inside the container are disposed inside the container, narrowing a cargo space in the container. Further, defrost operation is required in order to remove frost adhered to the evaporator (heat exchanger) placed inside the container, which may reduce low-temperature reliability of the cargo inside the container. Furthermore, the heating elements such as the motor are disposed inside the container, causing a hot spot or an uneven temperature inside the container.

In view of the above, an object of at least one embodiment of the present invention is to provide a reefer container capable of suppressing a reduction in cargo space inside the container and stably maintaining a temperature inside the container.

Solution to Problem

A reefer container according to at least one embodiment of the present invention is a reefer container configured to cool a gas inside a container body, including:
the container body; a circulation line with a suction port and a blowout port each of which is disposed inside the container body; a compressor disposed in the circulation line and configured to compress the gas suctioned from inside the container body to the circulation line through the suction port; a heat exchanger disposed in the circulation line and configured to cool the gas compressed in the compressor; an expander disposed in the circulation line and configured to expand the gas cooled in the heat exchanger; and at least one separation device disposed in the circulation line and configured to separate some of components from the gas compressed in the compressor.

Advantageous Effects

According to at least one embodiment of the present invention, a reefer container is provided which is capable of suppressing a reduction in cargo space inside the container and stably maintaining a temperature inside the container.

DETAILED DESCRIPTION

Figure 1:
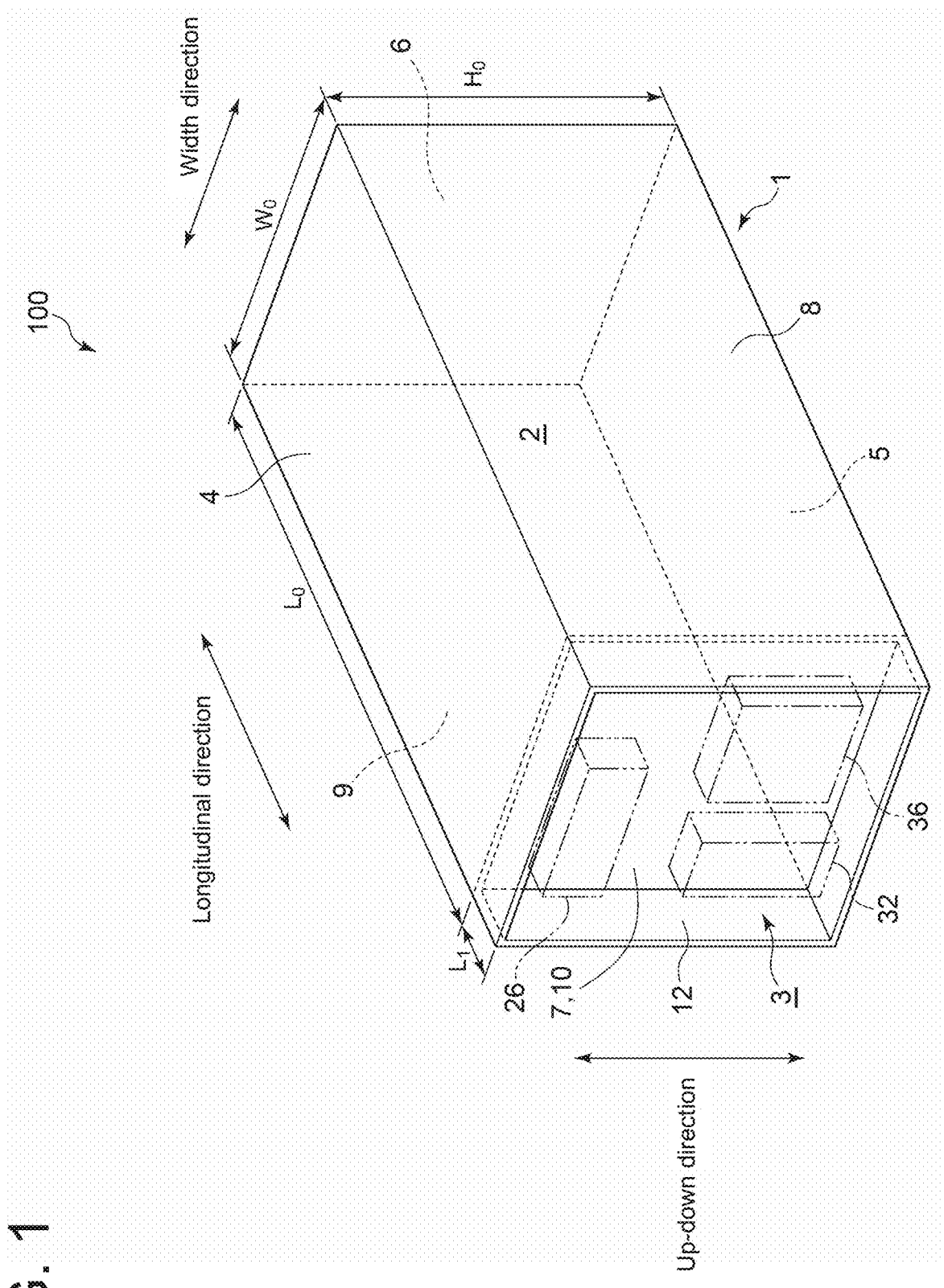
FIG. 1 is a schematic perspective view of a reefer container according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.
(Configuration of Reefer Container)

Figure 2:
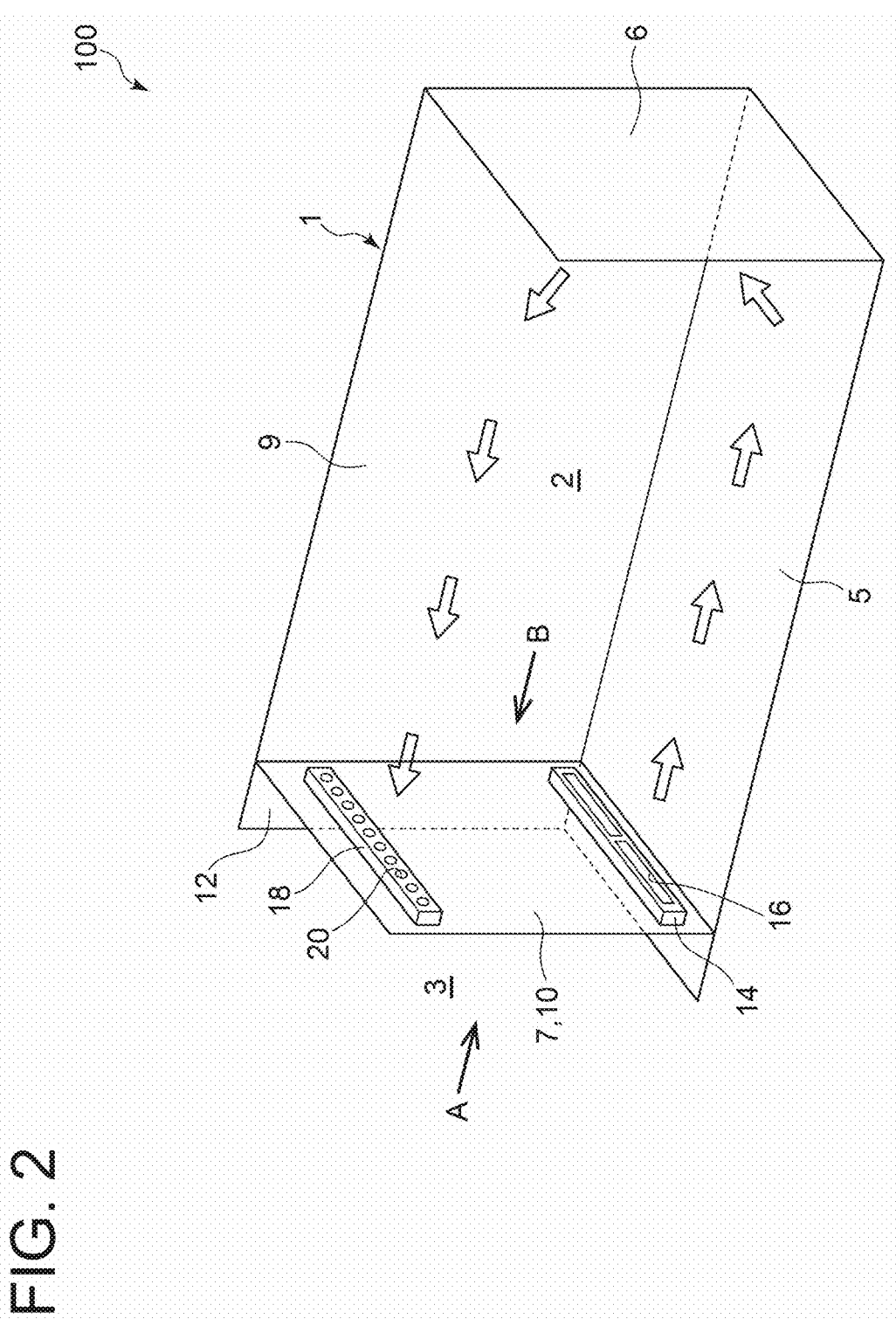
FIG. 2 is a schematic perspective view of the reefer container shown in FIG. 1, as seen in another direction.

FIG. 1 is a schematic perspective view of a reefer container 100 according to an embodiment. FIG. 2 is a schematic perspective view of the reefer container 100 shown in FIG. 1, as seen in another direction. FIG. 2 shows the interior of the reefer container 100 by omitting several walls forming the reefer container 100.

As shown in FIGS. 1 and 2, the reefer container 100 includes a container body 1 having an interior space 2 that can house goods such as cargo. The reefer container 100 is configured to cool a gas such as air inside (i.e., the interior space 2) the container body 1. The container body 1 has a plurality of walls 4 to 9 forming the interior space 2. Each of the plurality of walls 4 to 9 separates the interior space 2 and an exterior space 3 of the container body 1. The plurality of walls 4 to 9 include the ceiling wall 4, the bottom wall 5, one pair of short-side walls 6, 7, and one pair of long-side walls 8, 9.

The container body 1 may be a shipping container used to transport cargo, etc. The container body 1 may be a standard shipping container such as a 10 ft container, a 20 ft container, or a 40 ft container.

Figure 3:
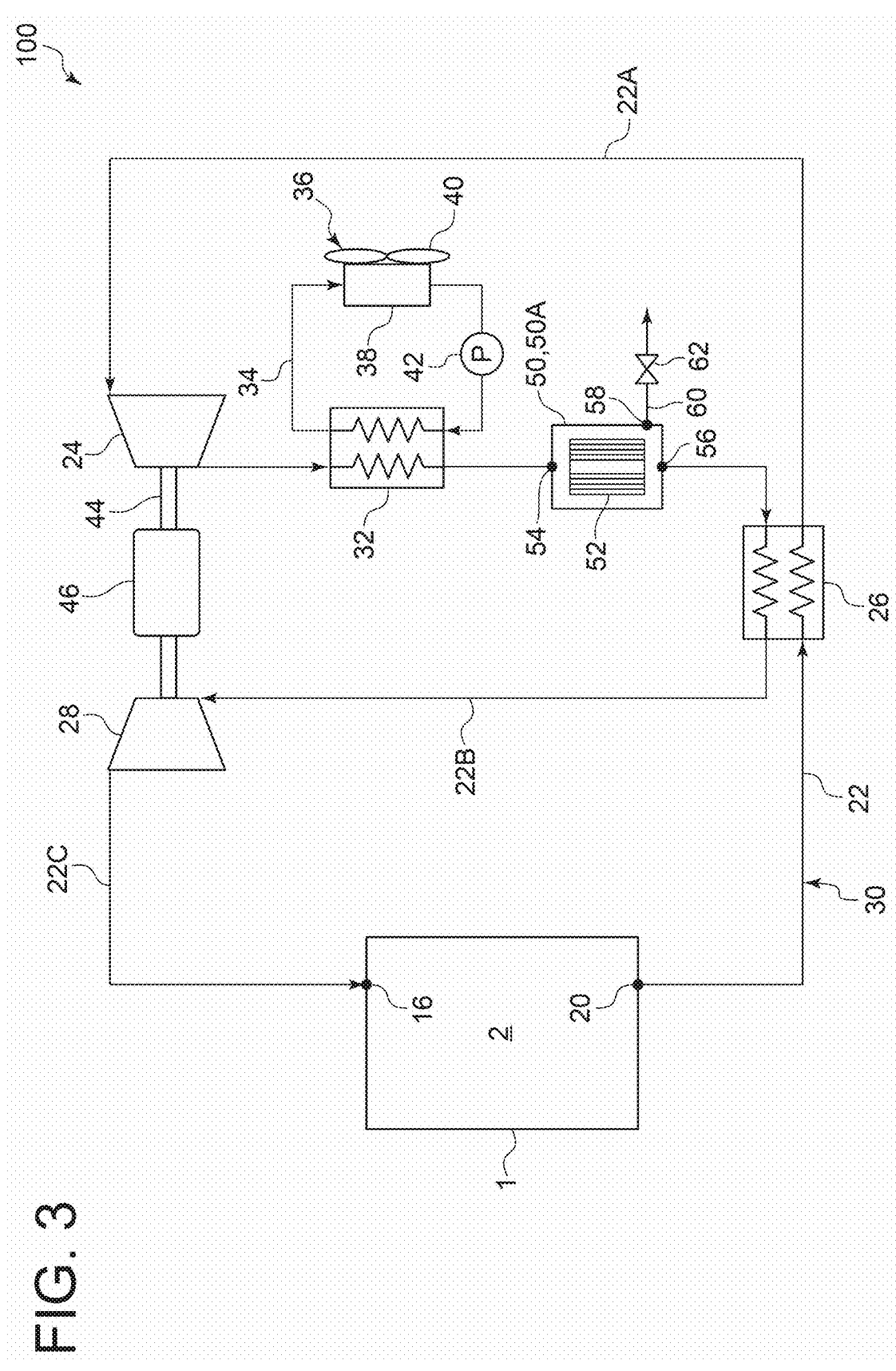
FIG. 3 is a diagram schematically showing a circuit of a refrigerator of the reefer container according to an embodiment.
Figure 4:
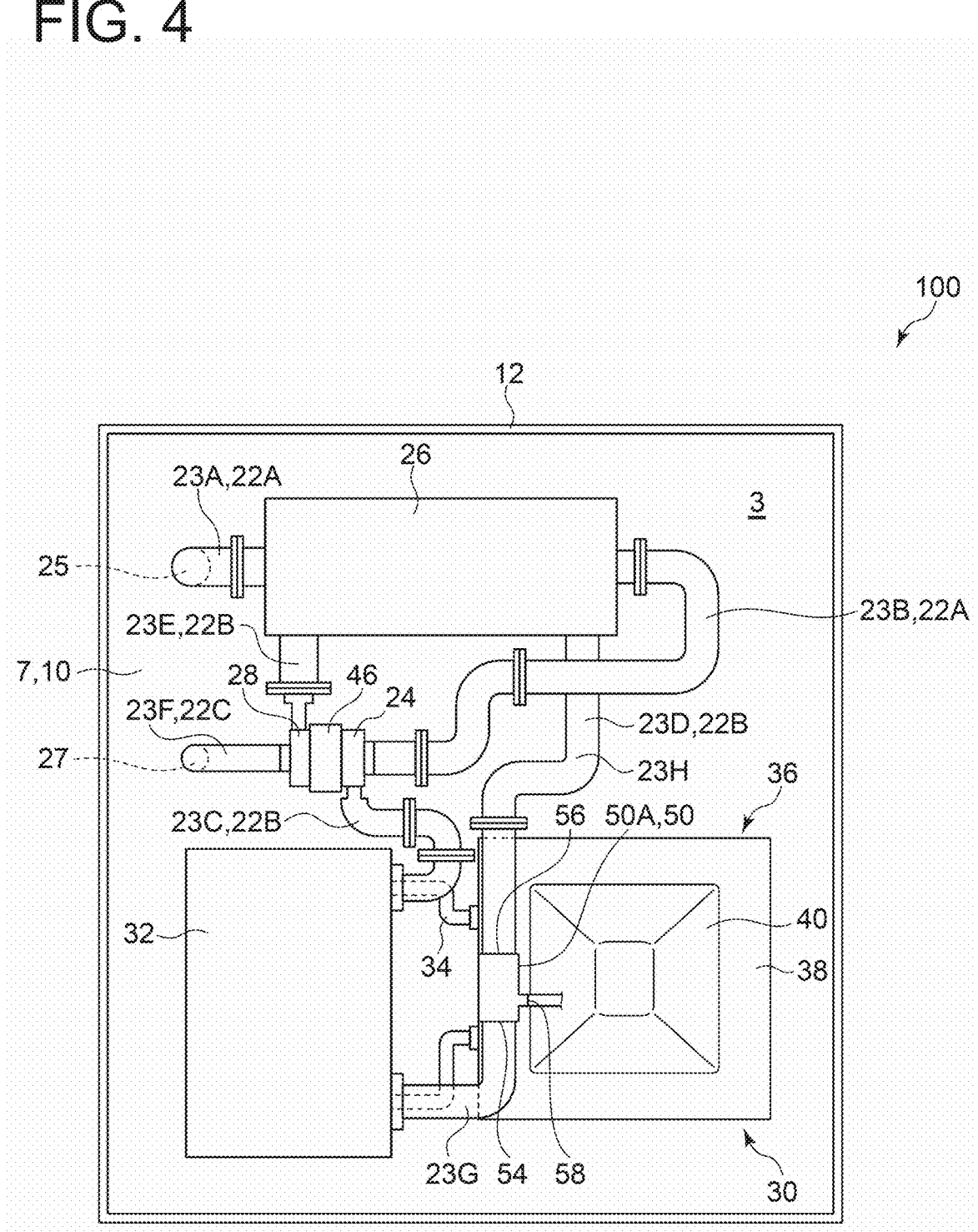
FIG. 4 is a view of the reefer container according to an embodiment, as seen in the direction of arrow A in FIG. 2.
Figure 5:
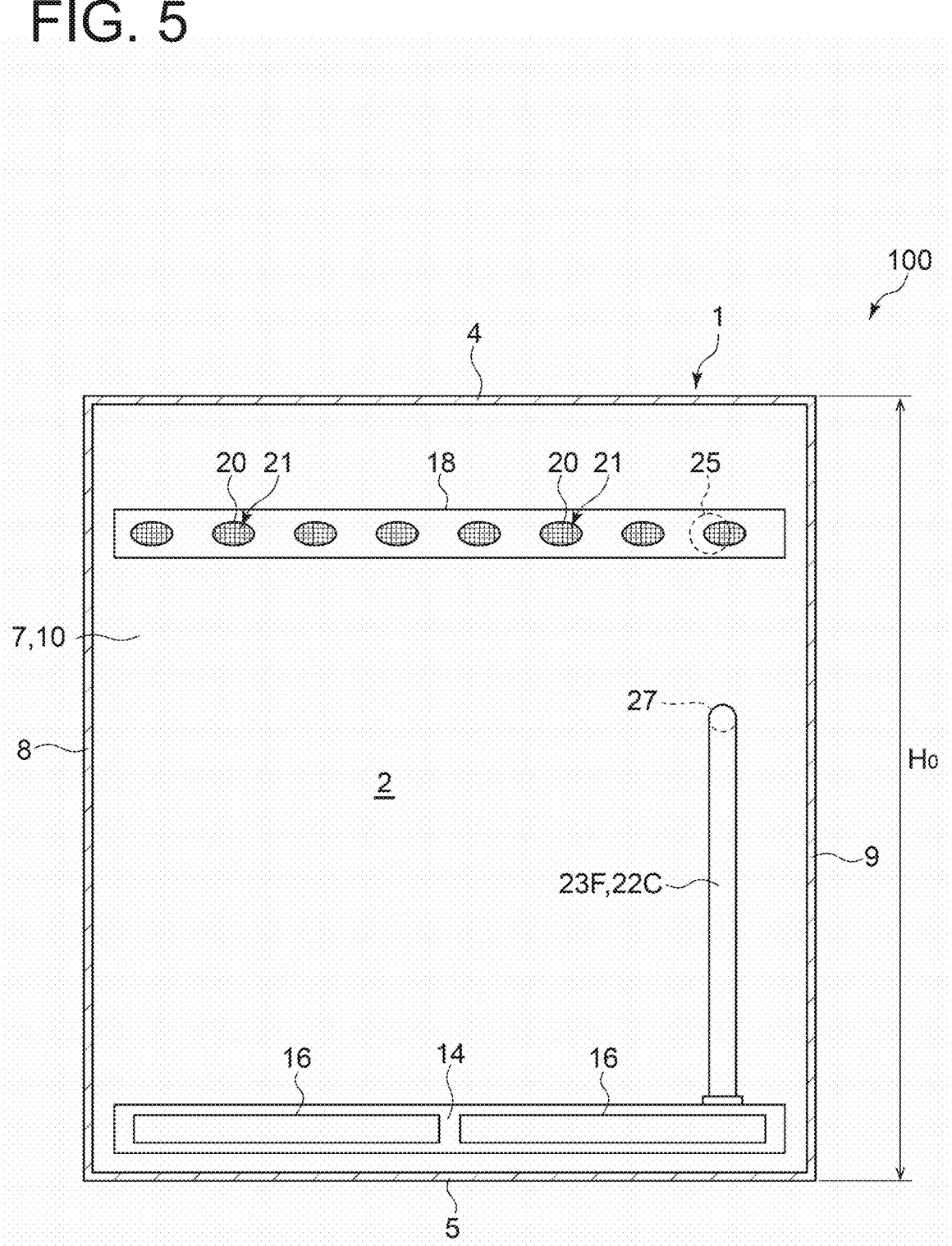
FIG. 5 is a view of the reefer container shown in FIG. 4, as seen in the direction of arrow B in FIG. 2.

FIG. 3 is a diagram schematically showing a circuit of a refrigerator (refrigeration cycle) of the reefer container 100 according to an embodiment. FIG. 4 is a view of the reefer container 100 according to an embodiment, as seen in the direction of arrow A in FIG. 2 (the longitudinal direction of the container body 1). FIG. 5 is a view of the reefer container 100 shown in FIG. 4, as seen in the direction of arrow B in FIG. 2 (an opposite direction from FIG. 4) from inside the container body 1.

As shown in FIGS. 2 to 5, the interior space 2 of the container body 1 is provided with a blowout portion 14 including a blowout port 16 (opening) for blowing a gas such as air to inside the container body L. and a suction portion 18 including a suction port 20 for suctioning the gas such as the air inside the container body 1. In FIGS. 3 and 4, the blowout portion 14 and the suction portion 18 are not illustrated.

(Refrigerator)

As shown in FIGS. 3 to 5, the reefer container 100 includes a circulation line 22 having the suction port 20 and the blowout port 16 which are described above, a compressor 24, a heat exchanger 26, and an expander 28. Each of the compressor 24, the heat exchanger 26, and the expander 28 is disposed in the circulation line 22. The circulation line 22, the compressor 24, the heat exchanger 26, and the expander 28 configure a refrigerator (refrigeration cycle) 30 that uses the gas inside the container body 1 (internal gas) as a refrigerant. The reefer container 100 can adjust a temperature of the internal gas by the refrigerator 30.

The circulation line 22 is a passage extending from the suction port 20 to the blowout port 16, and allows the gas suctioned from inside the container body 1 through the suction port 20 to flow. The compressor 24 is configured to compress the gas suctioned from inside the container body 1 to the circulation line 22 through the suction port 20. The gas inside the container body 1 is suctioned to the circulation line 22 through the suction port 20 by driving the compressor 24. The gas compressed in the compressor 24 is heated and pressurized compared to before being introduced to the compressor 24, and becomes a high temperature and pressure gas.

The heat exchanger 26 is configured to cool the high temperature and pressure gas compressed in the compressor 24. The expander 28 is configured to expand the gas cooled in the heat exchanger 26. The low-temperature gas expanded in the expander 28 is directed by the circulation line 22 to the blowout port 16, and is blown from the circulation line 22 to the interior of the container body 1 through the blowout port 16.

The circulation line 22 includes a suctioned-gas line 22A for directing the gas suctioned from the suction port 20 to the compressor 24, a compressed-gas line 22B for directing the gas compressed in the compressor 24 to the expander 28, and an expanded-gas line 22C for directing the gas expanded in the expander 28 to the blowout port 16.

(Heat Exchanger)

The heat exchanger 26 is configured to exchange heat between the gas flowing through the suctioned-gas line 22A and the gas flowing through the compressed-gas line 22B. The gas flowing through the compressed-gas line 22B is compressed in the compressor 24, thereby having the higher temperature than the gas flowing through the suctioned-gas line 22A. Due to the heat exchange in the heat exchanger 26, the gas flowing through the compressed-gas line 22B is cooled by the gas flowing through the suctioned-gas line 22A and the gas flowing through the suctioned-gas line 22A is heated by the gas flowing through the compressed-gas line 22B.

(Cooler)

As shown in FIGS. 3 and 4, the reefer container 100 may further include a cooler 32 disposed between the compressor 24 and the heat exchanger 26 in the circulation line 22. The cooler 32 is disposed upstream of the heat exchanger 26 in the compressed-gas line 22B and configured to exchange heat between the gas flowing through the compressed-gas line 22B (circulation line 22) and a coolant (for example, water) having a lower temperature than the gas. Due to the heat exchange in the cooler 32, the gas flowing through the compressed-gas line 22B toward the heat exchanger 26 is cooled by the coolant. The gas cooled in the cooler 32 is introduced to the heat exchanger 26 through the compressed-gas line 22B.

In the embodiments shown in FIGS. 3 and 4, the reefer container 100 further includes a coolant circulation line 34 for circulating the coolant. The coolant is supplied to the cooler 32 via the coolant circulation line 34. Specifically, the coolant circulation line 34 is provided with a radiator 38 configuring a cooling device 36 for cooling the coolant, and a pump 42 for pumping the coolant in the coolant circulation line 34. The cooling device 36 includes the radiator 38 and a fan 40 for air-cooling the radiator 38. The coolant increased in temperature by the heat exchange with the gas flowing through the compressed-gas line 22B in the cooler 32 is pumped by the pump 42 to the coolant circulation line 34 and cooled by the cooling device 36 including the radiator 38. The coolant cooled by the cooling device 36 is supplied to the cooler 32 via the coolant circulation line 34.

(Compressor, Expander)

In some embodiments, the expander 28 may be coupled to the compressor 24 via a rotational shaft 44. In the embodiments shown in FIGS. 3 and 4, the compressor 24 and the expander 28 are arranged coaxially with each other via the rotational shaft 44 which is an output shaft of a motor 46 for driving the compressor 24, and are each connected to the rotational shaft 44. The motor 46 is supplied with an electric current from a power source (such as a generator) which is not shown, and is driven by the electric current supplied from the power source to drive the rotational shaft 44, the compressor 24, and the expander 28. In the expander 28, part of expansion energy generated when the gas expands is recovered, and the recovered expansion energy assists in driving the compressor 24.

As shown in FIG. 4, the suctioned-gas line 22A, the compressed-gas line 22B, and the expanded-gas line 22C are respectively formed by pipes. The respective pipes forming the circulation line 22 may be a plurality of pipe portions connected via flanges, etc.

In the embodiment shown in FIG. 4, the pipes forming the suctioned-gas line 22A include a pipe 23A disposed between the suction port 20 and an inlet of the heat exchanger 26, and a pipe 23B disposed between the compressor 24 and an outlet of the heat exchanger 26. The pipes forming the compressed-gas line 22B include a pipe 23C disposed between an outlet of the compressor 24 and an inlet of the cooler 32, a pipe 23D disposed between an outlet of the cooler 32 and the inlet of the heat exchanger 26, and a pipe 23E disposed between the outlet of the heat exchanger 26 and an inlet of the expander 28. The pipe forming the expanded-gas line 22C includes a pipe 23F disposed between the blowout port 16 and an outlet of the expander 28.

(Separation Device)

Figure 6:
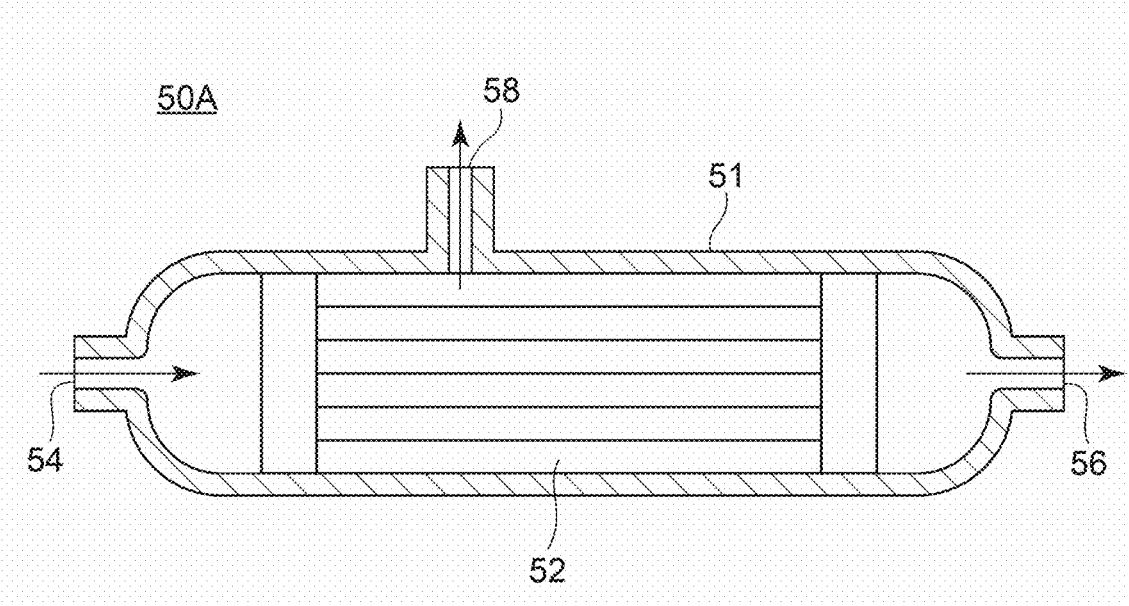
FIG. 6 is a schematic view of a separation device of the reefer container according to an embodiment.
Figure 7:
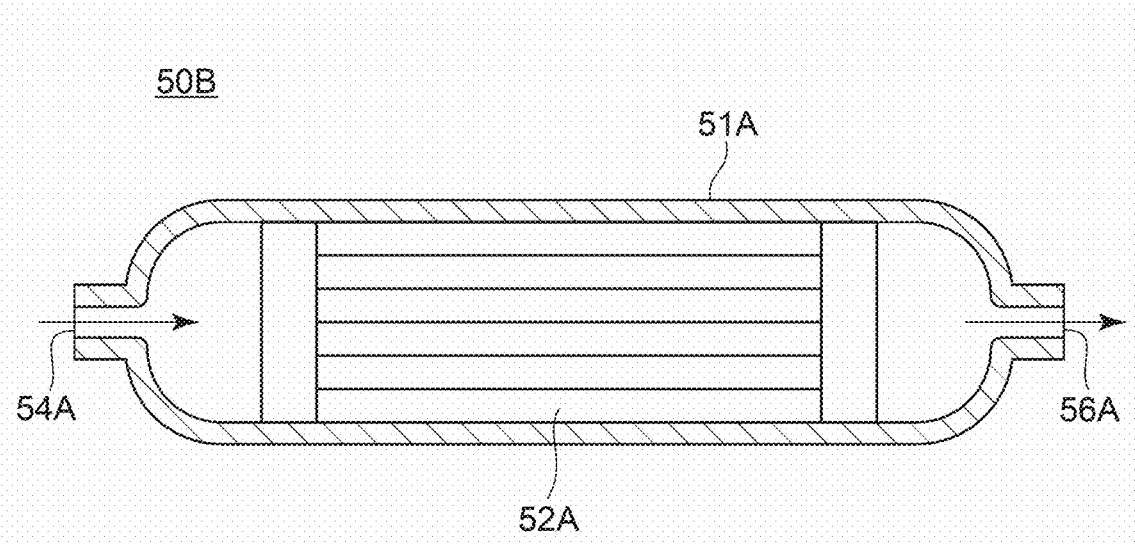
FIG. 7 is a schematic view of the separation device of the reefer container according to an embodiment.

FIGS. 6 and 7 are each a schematic view of a separation device 50 (50A, 50B) of the reefer container 100 according to an embodiment. FIGS. 8 to 11 are each a diagram schematically showing a circuit of the refrigerator 30 of the reefer container 100 according to an embodiment.

As shown in FIGS. 3, 4, and 8 to 11, the reefer container 100 according to some embodiments includes the above-described container body 1, the above-described circulation line 22, the above-described compressor 24, the above-described heat exchanger 26, the above-described expander 28, and at least one separation device 50 disposed in the circulation line 22 (refrigerator 30) and configured to separate some of components from the gas compressed in the compressor 24.

The components of the gas, which are separated from the gas in the separation device 50, may be components (elements or molecules such as oxygen and carbon dioxide) making up a gas (a gas mixture such as air), or may be components other than the components of the gas contained by the gas, for example, an odor component (odor molecule).

According to the above configuration, constructed is the refrigerator (refrigeration cycle) 30 including the compressor 24, the heat exchanger 26, and the expander 28 each of which is disposed in the circulation line 22, and using the gas inside the container body 1 (internal gas) as the refrigerant. The gas inside the container body 1 naturally circulates from the blowout port 16 to the suction port 20 due to a difference between a pressure in the blowout port 16 and a pressure in the suction port 20, eliminating the need for a fan for circulating the internal gas. Therefore, there is no increase in temperature inside the container due to the installation of the fan and a fan motor inside the container body 1. Accordingly, it is easy to maintain the temperature inside the container at a desired temperature. Further, since the fan and the fan motor are not disposed inside the container body 1, it is possible to secure a wide cargo space inside the container. Therefore, according to the above configuration, it is possible to obtain the reefer container 100 capable of suppressing a reduction in cargo space inside the container and stably maintaining the temperature inside the container.

According to the above configuration, the separation device 50 disposed in the refrigerator 30 can separate some of the components from the gas taken into the refrigerator 30. The separation device 50 adjusts the oxygen concentration of the gas taken into the refrigerator 30, removes the odor component, etc. According to the above configuration, the refrigerator 30 serving as a dual-use facility for the separation device 50 can introduce the gas from inside the container body 1 to the separation device 50 or discharge the gas from the separation device 50 to inside the container body 1, making it possible to reduce the size or weight of the reefer container 100.

If the refrigerator 30 is not the dual-use facility for the separation device 50, a dedicated pipe or device is required to introduce the gas from inside the container body 1 to the separation device 50 or discharge the gas from the separation device 50 to inside the container body 1. Consequently, it may be difficult to reduce the size or weight of the reefer container 100. Further, if the above-described dedicated pipe or device is simply made smaller, the flow rate of the gas to the separation device 50 decreases, making it necessary to increase power consumption of the motor 46 in order to compensate for the decreased flow rate of the gas to the separation device 50.

(Oxygen separator)

In some embodiments, the above-described at least one separation device 50 includes the oxygen separator 50A configured to separate oxygen from the gas compressed in the compressor 24, as shown in FIG. 6.

In the illustrated embodiment, the oxygen separator 50A has a membrane module 52 constituted by a bundle of hollow-fiber membranes, and a casing 51 housing the membrane module 52. The casing 51 is formed with a gas introduction port 54 for introducing the gas compressed in the compressor 24 to inside the casing 51, an unseparated-gas discharge port 56 for discharging an unseparated gas (for example, nitrogen) which is a gas that remains unseparated from the gas (for example, air) in the membrane module 52, and a separated-gas discharge port 58 for discharging a separated gas (for example, oxygen, carbon dioxide, moisture, etc.) which is a gas separated from the gas in the membrane module 52.

In the illustrated embodiment, the oxygen separator 50A is configured to extract gaseous oxygen from the gas by using a membrane separation method, that is, by using a difference in permeation rate of the respective components in the gas with respect to the membrane module 52. Specifically, gaseous oxygen, gaseous carbon dioxide, moisture, etc. permeates the hollow-fiber membrane at a higher rate than gaseous nitrogen. When the gas (for example, air) is fed into the membrane module 52 through the gas introduction port 54, the gaseous oxygen, the gaseous carbon dioxide, the moisture, etc. having the higher permeation rate passes through the hollow-fiber membrane and is discharged to outside the oxygen separator 50A through the separated-gas discharge port 58. Further, the gaseous nitrogen having the lower permeation rate does not pass through the hollow-fiber membrane and is discharged to outside the oxygen separator 50A through the unseparated-gas discharge port 56.

The oxygen separator 50A may not completely separate the gaseous oxygen, the gaseous carbon dioxide, the moisture, etc. from the gas, but only needs to be configured to extract part of the gaseous oxygen, the gaseous carbon dioxide, the moisture, etc. from the gas. That is, the gas discharged to outside the oxygen separator 50A through the unseparated-gas discharge port 56 may contain the gaseous oxygen or the gaseous carbon dioxide.

In the embodiment shown in FIG. 4, the above-described pipe 23D includes a pipe 23G disposed between the outlet of the cooler 32 and an inlet (the gas introduction port 54 in the illustrated example) of the separation device 50, and a pipe 23H disposed between the an outlet (the unseparated-gas discharge port 56 in the illustrated example) of the separation device 50 and the inlet of the heat exchanger 26. The gas cooled in the cooler 32 is directed to the separation device 50 via the pipe 23G. The gas from which some of the components are separated in the separation device 50 is directed to the heat exchanger 26 via the pipe 23H. Consequently, the gas returned to inside the container body 1 has some of its components separated in the separation device 50.

According to the above configuration, concentration adjustment to decrease the concentration of oxygen contained in the gas inside the container body 1 can be performed by separating oxygen from the gas taken into the refrigerator 30 in the oxygen separator 50A. The reefer container 100 can adjust the constituent concentration of the internal gas (for example, the concentration of oxygen or carbon dioxide) by performing the above-described concentration adjustment. Therefore, the reefer container 100 including the refrigerator 30 or the oxygen separator 50A can suitably be used as a CA container for transportation, storage, etc. Further, the refrigerator 30 using the internal gas as the refrigerant has the high flow rate of the gas flowing through the refrigerator 30. Therefore, since the flow rate of the gas introduced to the oxygen separator 50A disposed in the refrigerator 30 is high, the oxygen separator 50A can increase the speed of the concentration adjustment to decrease the concentration of oxygen.

According to the above configuration, the oxygen separator 50A having the membrane module 52 can extract the gaseous oxygen, the gaseous carbon dioxide, the moisture, etc. from the gas by using the difference in permeation rate of the respective gas components in the gas with respect to the membrane module 52. Therefore, according to the above configuration, since adjustment to decrease the oxygen concentration or humidity inside the container body 1 can be performed, quality deterioration due to oxidation of goods (for example, fresh products) placed inside the container body 1 can be suppressed by filling the interior of the container body 1 with nitrogen.

In some embodiments, as shown in FIGS. 3, 4, 8 to 11, the above-described oxygen separator 50A (separation device 50) is preferably disposed downstream of the cooler 32 and upstream of the heat exchanger 26 in the circulation line 22. In this case, the gas cooled in the cooler 32 is introduced to the oxygen separator 50A.

The gas compressed in the compressor 24 may become as hot as 100° C. depending on operating conditions of the compressor 24, and the membrane module 52 may be damaged if the hot gas is introduced to the oxygen separator 50A having the membrane module 52. According to the above configuration, the thermal damage to the membrane module 52 can be suppressed by pre-cooling in the cooler 32 the gas introduced to the oxygen separator 50A having the membrane module 52, enabling safe operation of the oxygen separator 50A.

The above-described oxygen separator 50A (separation device 50) may be disposed downstream of the compressor 24 and upstream of the cooler 32 in the circulation line 22.

(Deodorizer)

In some embodiments, the above-described at least one separation device 50 includes the deodorizer 50B configured to separate the odor component (odor molecule) from the gas compressed in the compressor 24, as shown in FIG. 7.

In the illustrated embodiment, the deodorizer 50B has a deodorizing filter 52A configured to adhere the odor component, and a casing 51A housing the deodorizing filter 52A. The casing 51A is formed with a gas introduction port 54A for introducing the gas compressed in the compressor 24 into the casing 51A, and a gas discharge port 56A for discharging the gas from which the odor component is removed in the deodorizing filter 52A. The pipe 23G may be connected to the gas introduction port 54A which is the inlet of the separation device 50, and the pipe 23H may be connected to the gas discharge port 56A which is the outlet of the separation device 50.

When the gas (for example, air) is fed into the deodorizing filter 52A through the gas introduction port 54A, the odor component which is larger than a pore formed in the deodorizing filter 52A cannot pass through the pore and adheres to the deodorizing filter 52A. The gas from which the odor component is removed through the pore formed in the deodorizing filter 52A is discharged to outside the deodorizer 50B through the gas discharge port 56A.

According to the above configuration, the odor component contained in the gas inside the container body 1 can be reduced by separating in the deodorizer 50B the odor component from the gas taken into the refrigerator 30. Since the flow rate of the gas introduced to the deodorizer 50B disposed in the refrigerator 30 is high, the deodorizer 50B can increase the speed at which the odor component is reduced. The deodorizer 50B may be disposed in the circulation line 22 instead of the oxygen separator 50A in FIGS. 3, 4, 8 to 11, or may be disposed in series with the oxygen separator 50A in the circulation line 22. The above-described at least one separation device 50 may include both the oxygen separator 50A and the deodorizer 50B.

(Bypass Line)

Figure 8:
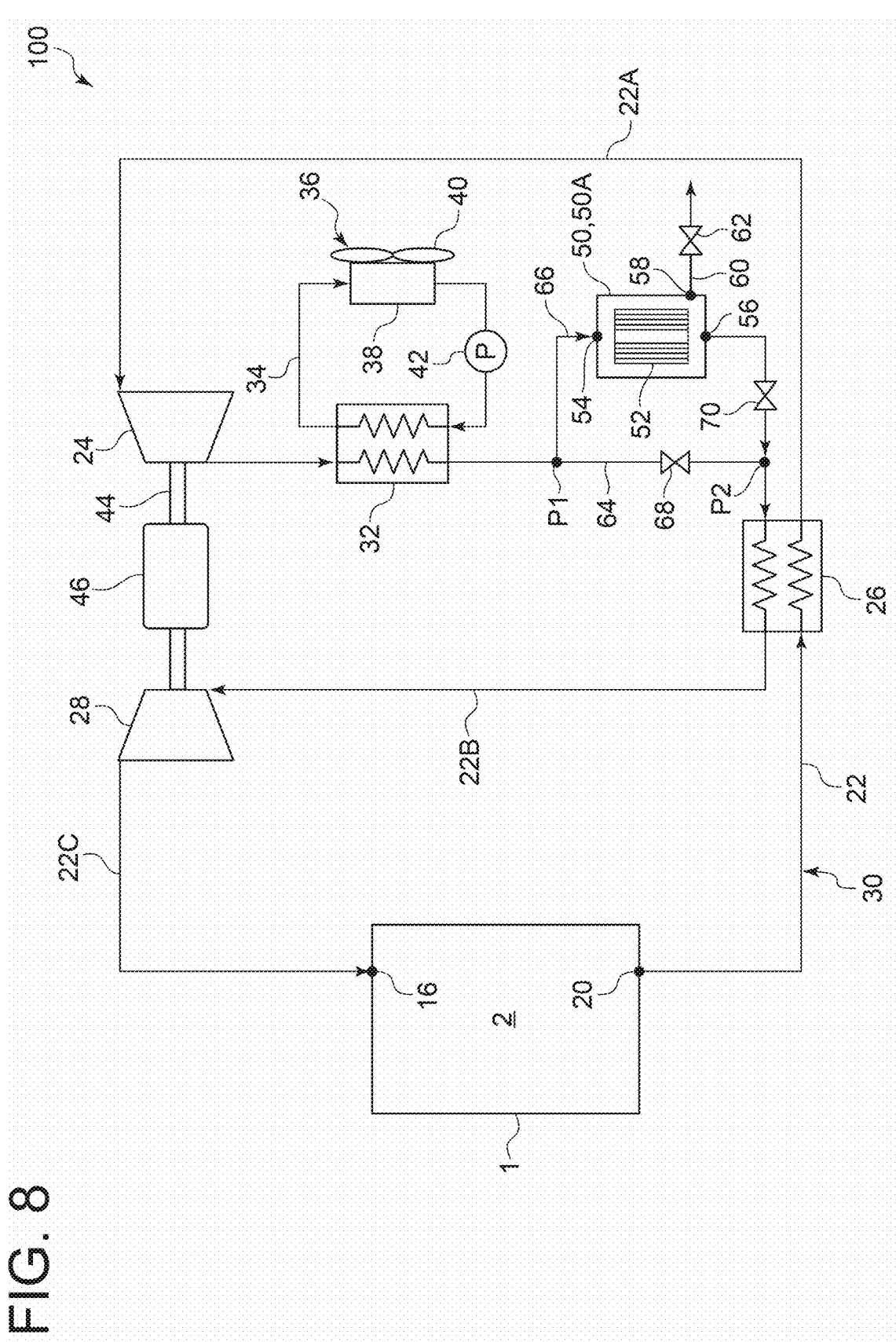
FIG. 8 is a diagram schematically showing the circuit of the refrigerator of the reefer container according to an embodiment.
Figure 10:
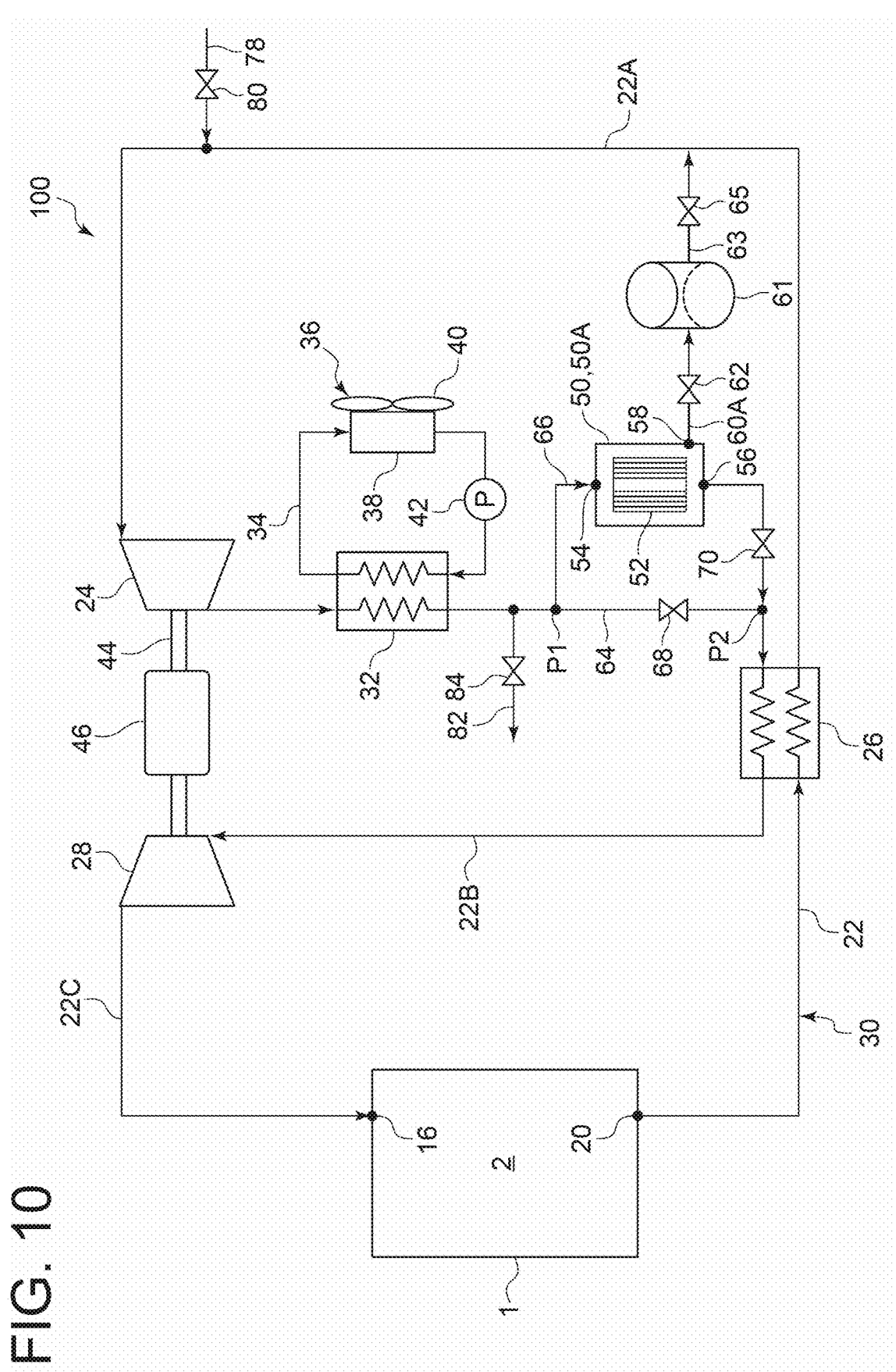
FIG. 10 is a diagram schematically showing the circuit of the refrigerator of the reefer container according to an embodiment.

In some embodiments, as shown in FIGS. 8 and 10, the above-described circulation line 22 includes a main line 64 for directing the gas compressed in the compressor 24 to the heat exchanger 26, and a bypass line 66 connected at one end to the main line 64 and connected at another end to a downstream side of a connection position P1 at the one end in the main line 64. The above-described at least one separation device 50 is disposed in the bypass line 66.

In the embodiments shown in FIGS. 8 and 10, the main line 64 constitutes part of the compressed-gas line 22B. The main line 64 is connected at one end to the outlet of the cooler 32 and connected at another end to the inlet of the heat exchanger 26. The bypass line 66 is connected at the one end to the connection position P1 in the main line 64 and connected at the another end to a connection position P2 located downstream (heat exchanger 26 side) of the connection position P1 in the main line 64. The oxygen separator 50A is disposed in the bypass line 66.

In the embodiments shown in FIGS. 8 and 10, the reefer container 100 includes a first gas flow control valve 68 disposed between the connection position P1 at the one end of the bypass line 66 and the connection position P2 at the another end of the bypass line 66 in the main line 64, and a second gas flow control valve 70 disposed in the bypass line 66. The gas flow control valves 68 and 70 are each configured to control the flow rate of the gas directed downstream of the gas flow control valves 68 and 70, by changing the opening degree of a valve plug (not shown).

According to the above configuration, the flow rate of the gas introduced to the separation device 50 disposed in the bypass line 66 can easily be controlled. Whereby, it is possible to improve controllability of the concentration adjustment to decrease the concentration of the oxygen contained in the gas inside the container body 1, and thus it is possible to improve controllability of the adjustment of the constituent concentration of the internal gas.

(Recirculation Line)

Figure 9:
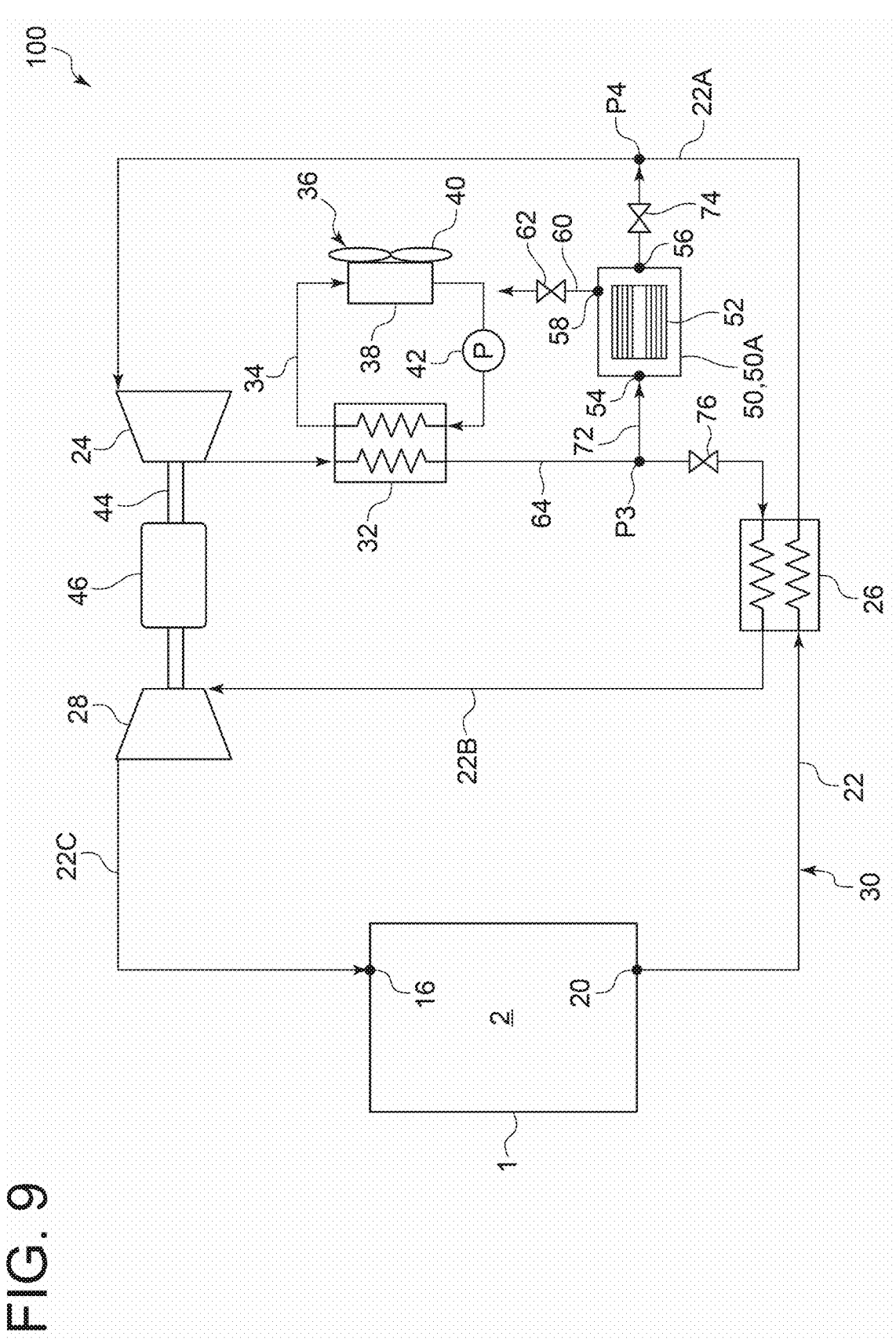
FIG. 9 is a diagram schematically showing the circuit of the refrigerator of the reefer container according to an embodiment.
Figure 11:
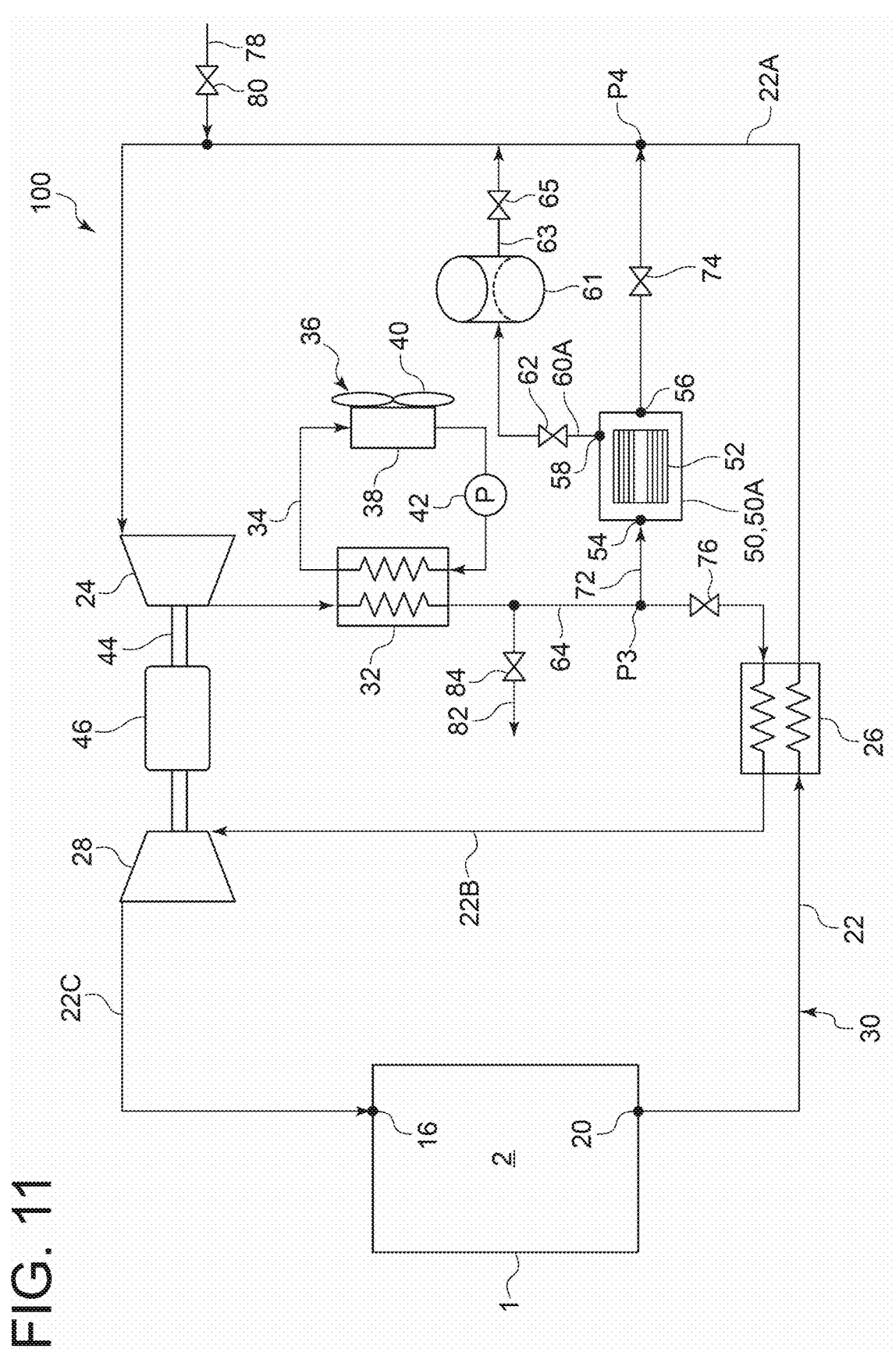
FIG. 11 is a diagram schematically showing the circuit of the refrigerator of the reefer container according to an embodiment.

In some embodiments, as shown in FIGS. 9 and 11, the above-described circulation line 22 includes the main line 64 for directing the gas compressed in the compressor 24 to the heat exchanger 26, and a recirculation line 72 connected at one end to the main line 64 and connected at another end to an upstream side of the compressor 24 in the circulation line 22. The above-described at least one separation device 50 is disposed in the recirculation line 72.

In the embodiments shown in FIGS. 9 and 11, the main line 64 is connected at the one end to the outlet of the cooler 32 and connected at the another end to the inlet of the heat exchanger 26. The recirculation line 72 is connected at one end to a connection position P3 in the main line 64 and connected at another end to a connection position P4 located between the heat exchanger 26 and the compressor 24 in the suctioned-gas line 22A (circulation line 22). The oxygen separator 50A is disposed in the recirculation line 72.

In the embodiments shown in FIGS. 9 and 11, the reefer container 100 includes a third gas flow control valve 74 disposed in the recirculation line 72, and a fourth gas flow control valve 76 disposed, in the main line 64, downstream (heat exchanger 26 side) of the connection position P3 at the one end of the recirculation line 72. The gas flow control valves 74 and 76 are each configured to control the flow rate of the gas directed downstream of the gas flow control valves 74 and 76, by changing the opening degree of a valve plug (not shown).

The gas is introduced to the separation device 50 a plurality of times by causing the gas to repeatedly circulate through a closed circuit including the recirculation line 72 and formed by closing the fourth gas flow control valve 76 and opening the third gas flow control valve 74.

According to the above configuration, the flow rate of the gas introduced to the separation device 50 disposed in the recirculation line 72 can easily be controlled. Whereby, it is possible to improve controllability of the concentration adjustment to decrease the concentration of the oxygen contained in the gas inside the container body 1, and thus it is possible to improve controllability of the adjustment of the constituent concentration of the internal gas. Further, since the separation device 50 is disposed in the recirculation line 72, the above-described bypass line 66 need not be disposed, making it possible to reduce the size and weight of the reefer container 100.

(Oxygen Discharge Line)

In some embodiments, as shown in FIGS. 3, 8, and 9, the above-described reefer container 100 further includes an oxygen discharge line 60 for discharging oxygen separated from the gas in the above-described oxygen separator 50A. The oxygen separated from the gas in the oxygen separator 50A is discharged to outside (exterior space 3) the container body 1 via the oxygen discharge line 60.

The oxygen discharge line 60 is formed by a pipe. In the illustrated embodiment, the oxygen discharge line 60 is connected at one end to the separated-gas discharge port 58 of the oxygen separator 50A and is open to the atmosphere (communicates with the exterior space 3) at another end. The reefer container 100 includes an oxygen discharge control valve 62 disposed in the oxygen discharge line 60. The oxygen discharge control valve 62 is configured to control the flow rate of the oxygen directed downstream (to another side) of the oxygen discharge control valve 62, by changing the opening degree of a valve plug (not shown).

(Buffer Tank)

In some embodiments, as shown in FIGS. 10 and 11, the above-described reefer container 100 further includes a buffer tank 61 configured to store the oxygen (separated gas) separated from the gas in the oxygen separator 50A, an oxygen recovery line 60A for directing the oxygen separated from the gas in the oxygen separator 50A to the buffer tank 61, and an oxygen return line 63 for returning the oxygen stored in the buffer tank 61 to inside the container body 1.

Each of the oxygen recovery line 60A and the oxygen return line 63 is formed by a pipe. In the illustrated embodiment, the oxygen recovery line 60A is connected at one end to the separated-gas discharge port 58 of the oxygen separator 50A having the membrane module 52 and is connected at another end to the buffer tank 61. The oxygen return line 63 is connected at one end to the buffer tank 61 and connected at another end to a portion between the heat exchanger 26 and the compressor 24 in the suctioned-gas line 22A (circulation line 22). The reefer container 100 includes an oxygen return control valve 65 disposed in the oxygen return line 63. The oxygen return control valve 65 is configured to control the flow rate of the oxygen directed downstream (to another side) of the oxygen return control valve 65, by changing the opening degree of a valve plug (not shown).

According to the above configuration, it is possible to store in the buffer tank 61 the oxygen (separated gas), which is separated from the gas in the oxygen separator 50A, via the oxygen recovery line 60A, and it is possible to return the oxygen stored in the buffer tank 61 to inside the container body 1 via the oxygen return line 63. Whereby, it is possible to quickly perform concentration adjustment to increase the concentration of the oxygen contained in the gas inside the container body 1. For example, if a person enters into the container body 1, the oxygen concentration in the interior space 2 needs to be above a predetermined concentration in order to prevent lack of oxygen, making it necessary to perform the concentration adjustment to increase the concentration of the oxygen contained in the gas inside the container body 1.

When the oxygen separator 50A has the membrane module 52, the separated gas separated from the gas in the oxygen separator 50A contains oxygen, carbon dioxide, and moisture. In this case, it is possible to store oxygen or moisture in the buffer tank 61, and it is possible to return the oxygen or the moisture (humidified air) stored in the buffer tank 61 to inside the container body 1 via the oxygen return line 63. The goods (for example, fresh products) placed inside the container body 1 can be moistened.

(Air Suction Line)

In some embodiments, as shown in FIGS. 10 and 11, the above-described reefer container 100 includes an air suction line 78 connected at one end to an upstream side of the compressor 24 in the circulation line 22 and open to the atmosphere (communicates with the exterior space 3) at another end.

The air suction line 78 is formed by a pipe. In the illustrated embodiment, the air suction line 78 is connected at one end to a portion between the heat exchanger 26 and the compressor 24 in the suctioned-gas line 22A (circulation line 22). Air is suctioned to the suctioned-gas line 22A from outside (exterior space 3) the container body 1 via the air suction line 78 by driving the compressor 24. The reefer container 100 includes an air suction control valve 80 disposed in the air suction line 78. The air suction control valve 80 is configured to control the flow rate of the air directed downstream (one end side) of the air suction control valve 80, by changing the opening degree of a valve plug (not shown).

According to the above configuration, the refrigerator 30 suctions the gas inside the container body 1 and returns the gas from which some of the components, such as oxygen, are removed to inside the container body 1. If this is repeated and negative pressure is created inside the container body 1, air may flow in from outside the container body 1. If air flows in from outside the container body 1, the interior of the container body 1 may be heated by heat of the air. According to the above configuration, air is taken into the circulation line 22 via the air suction line 78 and the gas from which oxygen is separated from the air is introduced to inside the container body 1, making it possible to create positive pressure inside the container body 1. Since positive pressure is created inside the container body 1, it is possible to prevent air from flowing in from outside the container body 1.

In some embodiments, as shown in FIGS. 10 and 11, the above-described reefer container 100 includes the above-described air suction line 78, and a gas discharge line 82 for discharging the gas compressed in the compressor 24 to outside the circulation line 22.

The gas discharge line 82 is formed by a pipe. In the illustrated embodiment, the gas discharge line 82 is connected at one end to the downstream side of the cooler 32 and the upstream side of the heat exchanger 26 in circulation line 22 and is open to the atmosphere (communicates with the exterior space 3) at another end. Due to a pressure difference caused between the one end and the another end of the gas discharge line 82 by driving the compressor 24, the gas is discharged from the circulation line 22 to outside (exterior space 3) the container body 1 via the gas discharge line 82. The reefer container 100 includes a gas discharge control valve 84 disposed in the gas discharge line 82. The gas discharge control valve 84 is configured to control the flow rate of the gas directed downstream (to another side) of the gas discharge control valve 84, by changing the opening degree of a valve plug (not shown).

According to the above configuration, since the gas is discharged to outside the circulation line 22 via the gas discharge line 82, it is possible to perform pressure control to decrease the pressure inside the container body 1. Whereby, it is possible to perform the above-described concentration adjustment inside the container body 1 without increasing the pressure inside the container body 1.

(Arrangement of Devices Configuring Refrigerator)

In some embodiments, as shown in FIGS. 1 and 4, each of the compressor 24, the cooler 32, the heat exchanger 26, the expander 28, and the at least one separation device 50 is arranged, in the exterior space 3 of the container body 1, along a partition wall 10 that separates the interior space 2 of the container body 1 and the exterior space 3.

In the illustrated embodiment, the above-described devices disposed in the circulation line 22 are arranged along the short-side wall 7 as the partition wall 10. In FIG. 1, some of the above-described devices disposed in the circulation line 22 are schematically indicated by double-dotted chain lines.

As shown in FIGS. 1 and 4, the above-described reefer container 100 may include a cover 12 disposed so as to enclose the above-described devices, which are disposed in the exterior space 3 of the container body 1, from above, below, and sides.

As shown in FIGS. 4 and 5, the pipe 23A between the suction port 20 and the heat exchanger 26 may be disposed so as to insert through a through hole 25 disposed in the short-side wall 7 (partition wall 10). Further, the pipe 23F between the expander 28 and the blowout port 16 may be disposed so as to insert through a through hole 27 disposed in the short-side wall 7 (partition wall 10).

According to the above configuration, each of the compressor 24, the cooler 32, the heat exchanger 26, the expander 28, and the at least one separation device 50 is installed in the exterior space 3 of the container body 1. That is, since these devices are not disposed in the interior space 2 of the container body 1, it is possible to secure a wide cargo space inside the container. Further, in the above configuration, a heat exchanger such as an evaporator need not be disposed in the interior space 2 of the container body 1, making it unnecessary to perform defrosting operation to defrost such a heat exchanger. Accordingly, it is easy to maintain the temperature inside the container at a desired temperature. Further, in the above configuration, the devices configuring the refrigerator 30 or the separation device 50 are arranged in a relatively narrow space along the partition wall 10 in the exterior space 3 of the container body 1. Since the installation region for the refrigerator 30 or the separation device 50 added to the container body 1 is thus small, the reefer container 100 including the refrigerator 30 or the separation device 50 can suitably be used as a container for transportation, etc.

In some embodiments, at least either of the heat exchanger 26 or the cooler 32 described above may include a plate heat exchanger or a microchannel heat exchanger. The plate heat exchanger or the microchannel heat exchanger may be formed from a material including aluminum or titanium.

In some embodiments, the suction port 20 is provided with a filter portion 21 for removing a foreign matter, as shown in FIG. 5. The filter portion 21 includes a plurality of holes or a member with mesh, etc., and has a plurality of openings formed by these holes, the mesh, etc.

In some embodiments, as shown in FIG. 1, the partition 10 (the short-side wall 7 of the container body 1 in the example shown in FIG. 1) that separates the interior space 2 of the container body 1 from the region where the compressor 24, the cooler 32, the heat exchanger 26, the expander 28, and the at least one separation device 50 are installed outside the container body 1 extends along a plane orthogonal to the longitudinal direction of the container body 1.

In the above-described embodiment, the devices (the compressor 24, the heat exchanger 26, the expander 28) configuring the refrigerator 30 or the separation device 50 are arranged in the relatively narrow space along the partition wall 10 (short-side wall 7) which is a relatively small wall extending along the plane orthogonal to the longitudinal direction of the container body 1. Whereby, it is possible to reduce the installation region for the refrigerator 30 or the separation device 50 added to the container body 1, and the reefer container 100 including the refrigerator 30 or the separation device 50 can suitably be used as the container for transportation, etc.

In an embodiment, each of the compressor 24, the cooler 32, the heat exchanger 26, the expander 28, and the at least one separation device 50 may be arranged, in the exterior space 3, within a range where a length L1 from the partition wall 10 in the longitudinal direction of the container body 1 is not greater than $\frac{1}{10}$ of a length L0 of the container body 1 (see FIG. 1).

In this case, the installation region for the devices configuring the refrigerator 30 or the separation device 50 is within the range of not greater than $\frac{1}{10}$ of the length L0 of the container body 1. Thus, since the installation region for the refrigerator 30 or the separation device 50 added to the container body 1 is small, the reefer container 100 including the refrigerator 30 or the separation device 50 can suitably be used as the container for transportation, etc.

For example, if the container body 1 is a 20-ft container (length L0: approximately 6.1 m, width W0: approximately 2.4 m, height H0: approximately 2.6 in), the length (L1) of the above-described installation region may be not greater than 610 mm.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function. For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, the expressions "comprising", "including" or "having" one constitutional element is not an exclusive expression that excludes the presence of other constitutional elements.

The present disclosure is not limited to the above-described embodiments, and also includes an embodiment obtained by modifying the above-described embodiments or an embodiment obtained by combining these embodiments as appropriate.

The contents described in some embodiments described above would be understood as follows, for instance.

1) A reefer container (100) according to at least one embodiment of the present disclosure is a reefer container (100) configured to cool a gas inside a container body (1), including: the container body (1); a circulation line (22) with a suction port (20) and a blowout port (16) each of which is disposed inside the container body (1); a compressor (24) disposed in the circulation line (22) and configured to compress the gas suctioned from inside the container body (1) to the circulation line (22) through the suction port (20); a heat exchanger (26) disposed in the circulation line (22) and configured to cool the gas compressed in the compressor (24); an expander (28) disposed in the circulation line (22) and configured to expand the gas cooled in the heat exchanger (26); and at least one separation device (50) disposed in the circulation line (22) and configured to separate some of components from the gas compressed in the compressor (24).

According to the above configuration 1), constructed is the refrigerator (30) including the compressor (24), the heat exchanger (26), and the expander (28) each of which is disposed in the circulation line (22), and using the gas inside the container body (1) (internal gas) as the refrigerant. The gas inside the container body (1) naturally circulates from the blowout port (16) to the suction port (20) due to a difference between a pressure in the blowout port (16) and a pressure in the suction port (20), eliminating the need for a fan for circulating the internal gas. Therefore, there is no increase in temperature inside the container due to the installation of the fan and a fan motor inside the container body (1). Accordingly, it is easy to maintain the temperature inside the container at a desired temperature. Further, since the fan and the fan motor are not disposed inside the container body (1), it is possible to secure a wide cargo space inside the container body (1). Therefore, according to the above configuration (1), it is possible to obtain the reefer container 100 capable of suppressing a reduction in cargo space inside the container and stably maintaining the temperature inside the container.

According to the above configuration 1), the separation device (50) disposed in the refrigerator (30) can separate some of the components from the gas taken into the refrigerator (30). The separation device (50) adjusts the oxygen concentration of the gas taken into the refrigerator (30), removes the odor component, etc. According to the above configuration 1), the refrigerator (30) serving as a dual-use facility for the separation device (50) can introduce the gas from inside the container body (1) to the separation device (50) or discharge the gas from the separation device (50) to inside the container body (1), making it possible to reduce the size or weight of the reefer container (100).

2) In some embodiments, the reefer container (100) as defined in the above 1), wherein the at least one separation device (50) includes an oxygen separator (50A) configured to separate oxygen from the gas compressed in the compressor (24).

According to the above configuration 2), concentration adjustment to decrease the concentration of oxygen contained in the gas inside the container body (1) can be performed by separating oxygen from the gas taken into the refrigerator (30) in the oxygen separator (50A). The reefer container (100) can adjust the constituent concentration of the internal gas (for example, the concentration of oxygen or carbon dioxide) by performing the above-described concentration adjustment in the oxygen separator (50A). Therefore, the reefer container (100) including the refrigerator (30) or the oxygen separator (50A) can suitably be used as a CA container for transportation, storage, etc. Further, the refrigerator (30) using the internal gas as the refrigerant has the high flow rate of the gas flowing through the refrigerator (30). Therefore, since the flow rate of the gas introduced to the oxygen separator (50A) disposed in the refrigerator (30) is high, the oxygen separator (50A) can increase the speed of the concentration adjustment to decrease the concentration of oxygen.

3) In some embodiments, the reefer container (100) as defined in the above 2), wherein the oxygen separator (50A) has a membrane module (52) constituted by a bundle of hollow-fiber membranes.

According to the above configuration 3), the oxygen separator (50A) having the membrane module (52) can extract the gaseous oxygen, the gaseous carbon dioxide, the moisture, etc. from the gas by using the difference in permeation rate of the respective gas components in the gas with respect to the membrane module (52). Therefore, according to the above configuration 3), since adjustment to decrease the oxygen concentration or humidity inside the container body (1) can be performed, quality deterioration due to oxidation of goods (for example, fresh products) placed inside the container body (1) can be suppressed by filling the interior of the container body (1) with nitrogen.

4) In some embodiments, the reefer container (100) as defined in the above 3), further includes: a cooler (32) disposed between the compressor (24) and the heat exchanger (26) in the circulation line (22) and configured to exchange heat between a coolant and the gas flowing through the circulation line (22). The oxygen separator (50A) is disposed downstream of the cooler (32) and upstream of the heat exchanger (26) in the circulation line (22).

The gas compressed in the compressor (24) may become as hot as 100° C. depending on operating conditions of the compressor (24), and the membrane module (52) may be damaged if the hot gas is introduced to the oxygen separator (50A) having the membrane module (52). According to the above configuration 4), the thermal damage to the membrane module (52) can be suppressed by pre-cooling in the cooler (32) the gas introduced to the oxygen separator (50A) having the membrane module (52), enabling safe operation of the oxygen separator (50A).

5) In some embodiments, the reefer container (100) as defined in any of the above 1) to 4), wherein the circulation line (22) includes: a main line (64) for directing the gas compressed in the compressor (24) to the heat exchanger (26); and a bypass line (66) connected at one end to the main line (64) and connected at another end to a downstream side of a connection position (P1) at the one end in the main line (64), and wherein the at least one separation device (50) is disposed in the bypass line (66).

According to the above configuration 5), the flow rate of the gas introduced to the separation device (50) disposed in the bypass line (66) can easily be controlled. Whereby, it is possible to improve controllability of the concentration adjustment to decrease the concentration of the oxygen contained in the gas inside the container body (1), and thus it is possible to improve controllability of the adjustment of the constituent concentration of the internal gas.

6) In some embodiments, the reefer container (100) as defined in any of the above 1) to 4), wherein the circulation line (22) includes: a main line (64) for directing the gas compressed in the compressor (24) to the heat exchanger (26); and a recirculation line (72) connected at one end to the main line (64) and connected at another end to an upstream side of the compressor (24) in the circulation line (22), and wherein the at least one separation device (50) is disposed in the recirculation line (72).

According to the above configuration 6), the flow rate of the gas introduced to the separation device (50) disposed in the recirculation line (72) can easily be controlled. Whereby, it is possible to improve controllability of the concentration adjustment to decrease the concentration of the oxygen contained in the gas inside the container body (1), and thus it is possible to improve controllability of the adjustment of the constituent concentration of the internal gas. Further, since the separation device (50) is disposed in the recirculation line (72), the above-described bypass line (66) need not be disposed, making it possible to reduce the size and weight of the reefer container (100).

7) In some embodiments, the reefer container (100) as defined in any of the above 2) to 4), further includes: a buffer tank (61) configured to store the oxygen separated from the gas in the oxygen separator (50A); an oxygen recovery line (60A) for directing to the buffer tank (61) the oxygen separated from the gas in the oxygen separator (50A); and an oxygen return line (63) for returning the oxygen stored in the buffer tank (61) to inside the container body (1).

According to the above configuration 7), it is possible to store in the buffer tank (61) the oxygen, which is separated from the gas in the oxygen separator (50A), via the oxygen recovery line (60A), and it is possible to return the oxygen stored in the buffer tank (61) to inside the container body (1) via the oxygen return line (63). Whereby, it is possible to quickly perform concentration adjustment to increase the concentration of the oxygen contained in the gas inside the container body (1).

8) In some embodiments, the reefer container (100) as defined in any of the above 1) to 7), further includes: an air suction line (78) connected at one end to an upstream side of the compressor (24) in the circulation line (22) and open to the atmosphere at another end.

According to the above configuration 8), the refrigerator (30) suctions the gas inside the container body (1) and returns the gas from which some of the components, such as oxygen, are removed to inside the container body (1). If this is repeated and negative pressure is created inside the container body (1), air may flow in from outside the container body (1). If air flows in from outside the container body (1), the interior of the container body (1) may be heated by heat of the air. According to the above configuration 8), air is taken into the circulation line (22) via the air suction line (78) and the gas from which oxygen is separated from the air is introduced to inside the container body (1), making it possible to create positive pressure inside the container body (1). Since positive pressure is created inside the container body (1), it is possible to prevent air from flowing in from outside the container body (1).

9) In some embodiments, the reefer container (100) as defined in the above 8), further includes: a cooler (32) disposed between the compressor (24) and the heat exchanger (26) in the circulation line (22) and configured to exchange heat between a coolant and the gas flowing through the circulation line (22); and a gas discharge line (82) for discharging the gas compressed in the compressor (24) to outside the circulation line (22), the gas discharge line (82) being connected at one end to a downstream side of the cooler (22) and an upstream side of the heat exchanger (26) in the circulation line (22).

According to the above configuration 9), since the gas is discharged to outside the circulation line (22) via the gas discharge line (82), it is possible to perform pressure control to decrease the pressure inside the container body (1). Whereby, it is possible to perform the above-described concentration adjustment inside the container body (1) without increasing the pressure inside the container body (1).

10) In some embodiments, the reefer container (100) as defined in any of the above 1) to 9), wherein each of the compressor (24), the heat exchanger (26), the expander (28), and the at least one separation device (50) is arranged, in an exterior space (3) of the container body (1), along a partition wall (10) that separates an interior space (2) of the container body (1) and the exterior space (3).

According to the above configuration 10), each of the compressor (24), the heat exchanger (26), the expander (28), and the at least one separation device (50) is installed in the exterior space (3) of the container body (1). That is, since these devices are not disposed in the interior space (2) of the container body (1), it is possible to secure a wide cargo space inside the container. Further, in the above configuration 10), a heat exchanger such as an evaporator need not be disposed in the interior space (2) of the container body (1), making it unnecessary to perform defrosting operation to defrost such a heat exchanger. Accordingly, it is easy to maintain the temperature inside the container at a desired temperature. Further, in the above configuration 10), the devices configuring the refrigerator (30) or the separation device (50) are arranged in a relatively narrow space along the partition wall (10) in the exterior space (3) of the container body (1). Since the installation region for the refrigerator (30) or the separation device (50) added to the container body (1) is thus small, the reefer container (100) including the refrigerator (30) or the separation device (50) can suitably be used as a container for transportation, etc.

REFERENCE SIGNS LIST

1 Container body
2 Interior space
3 Exterior space
4 Ceiling wall
5 Bottom wall
6, 7 Short-side wall
8, 9 Long-side wall 10 Partition wall
12 Cover
14 Blowout portion
16 Blowout port
18 Suction portion
20 Suction port
21 Filter portion
22 Circulation line
22A Suctioned-gas line
22B Compressed-gas line
22C Expanded-gas line
23A to 23H Pipe
24 Compressor
25, 27 Through hole
26 Heat exchanger
28 Expander
30 Refrigerator
32 Cooler
34 Coolant circulation line
36 Cooling device
38 Radiator
40 Fan
42 Pump
44 Rotational shaft
46 Motor
50 Separation device
50A Oxygen separator
50B Deodorizer
51, 51A Casing
52 Membrane module
52A Deodorizing filter
54, 54A Gas introduction port
56 Unseparated-gas discharge port
56A Gas discharge port
58 Separated-gas discharge port
60 Oxygen discharge line
60A Oxygen recovery line
61 Buffer tank
62 Oxygen discharge control valve
63 Oxygen return line
64 Main line
65 Oxygen return control valve
66 Bypass line
68 First gas flow control valve
70 Second gas flow control valve
72 Recirculation line
74 Third gas flow control valve
76 Fourth gas flow control valve
78 Air suction line
80 Air suction control valve
82 Gas discharge line
84 Gas discharge control valve
100 Reefer container

The invention claimed is:

1. A reefer container configured to cool a gas inside a container body, comprising:

the container body;

a circulation line with a suction port and a blowout port each of which is disposed inside the container body;

a compressor disposed in the circulation line and configured to compress the gas suctioned from inside the container body to the circulation line through the suction port;

a heat exchanger disposed in the circulation line and configured to cool the gas compressed in the compressor;

an expander disposed in the circulation line and configured to expand the gas cooled in the heat exchanger; and at least one separation device disposed in the circulation line and configured to separate some of components from the gas compressed in the compressor, wherein the at least one separation device includes an oxygen separator configured to separate oxygen from the gas compressed in the compressor, and wherein the reefer container further comprises:

a buffer tank configured to store the oxygen separated from the gas in the oxygen separator;

an oxygen recovery line for directing to the buffer tank the oxygen separated from the gas in the oxygen separator; and an oxygen return line for returning the oxygen stored in the buffer tank to inside the container body.

2. The reefer container according to claim 1, wherein the oxygen separator has a membrane module constituted by a bundle of hollow-fiber membranes.

3. The reefer container according to claim 2, further comprising:

a cooler disposed between the compressor and the heat exchanger in the circulation line and configured to exchange heat between a coolant and the gas flowing through the circulation line, wherein the oxygen separator is disposed downstream of the cooler and upstream of the heat exchanger in the circulation line.

4. The reefer container according to claim 1, wherein the circulation line includes:

a main line for directing the gas compressed in the compressor to the heat exchanger; and a bypass line connected at one end to the main line and connected at another end to a downstream side of a connection position at the one end in the main line, and wherein the at least one separation device is disposed in the bypass line.

5. The reefer container according to claim 1, wherein the circulation line includes:

a main line for directing the gas compressed in the compressor to the heat exchanger; and a recirculation line connected at one end to the main line and connected at another end to an upstream side of the compressor in the circulation line, and wherein the at least one separation device is disposed in the recirculation line.

6. The reefer container according to claim 1, further comprising:

an air suction line connected at one end to an upstream side of the compressor in the circulation line and open to the atmosphere at another end.

7. The reefer container according to claim 6, further comprising:

a cooler disposed between the compressor and the heat exchanger in the circulation line and configured to exchange heat between a coolant and the gas flowing through the circulation line; and a gas discharge line for discharging the gas compressed in the compressor to outside the circulation line, the gas discharge line being connected at one end to a downstream side of the cooler and an upstream side of the heat exchanger in the circulation line.

8. The reefer container according to claim 1,
wherein each of the compressor, the heat exchanger, the expander, and the at least one separation device is arranged, in an exterior space of the container body, along a partition wall that separates an interior space of the container body and the exterior space.

\* \* \* \* \*